United States Patent
Kraemer et al.

(10) Patent No.: US 11,037,118 B2
(45) Date of Patent: Jun. 15, 2021

(54) ZERO KNOWLEDGE THIRD PARTY GUARANTEE OF SERVICE ON DECENTRALIZED COMPUTING PLATFORM

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 15/499,975

(22) Filed: Apr. 28, 2017

(65) Prior Publication Data
US 2018/0315026 A1   Nov. 1, 2018

(51) Int. Cl.
*G06Q 20/06* (2012.01)
*G06Q 20/14* (2012.01)
(Continued)

(52) U.S. Cl.
CPC .......... *G06Q 20/145* (2013.01); *G06F 21/10* (2013.01); *G06F 21/6245* (2013.01);
(Continued)

(58) Field of Classification Search
CPC ............. G06Q 20/065; G06Q 20/1235; G06Q 20/145; G06Q 30/0277; G06Q 20/38215;
(Continued)

(56) References Cited

U.S. PATENT DOCUMENTS

| 8,438,068 B2 * | 5/2013 | Kirovski | .............. G06Q 50/188 |
| | | | 705/26.1 |
| 2002/0099564 A1 * | 7/2002 | Kim | ...................... G06Q 30/02 |
| | | | 705/1.1 |

(Continued)

FOREIGN PATENT DOCUMENTS

JP        2003162591 A  *  6/2003   ........... H04L 12/801

OTHER PUBLICATIONS

U.S. Appl. No. 14/752,230, filed Jun. 26, 2015.
(Continued)

*Primary Examiner* — Mamon Obeid
*Assistant Examiner* — Chunling Ding
(74) *Attorney, Agent, or Firm* — Fleit Intellectual Property Law; Jon Gibbons

(57) ABSTRACT

A service running on a server, for example as a cloud server, that services with a guarantee from a guarantor. The service includes receiving, from a user using a zero-knowledge protocol to ensure privacy of the user, a request for a service with an associated quality level for a fee. Next, the request for service received requires a guarantee of the service requiring additional assurances based on a rating quantity available by a guarantor of the service is identified. At least a portion of the rating quantity available by the guarantor of the service is received. A notification from the user that the service is unacceptable is received. In response to the notification and a verification that the associated quality level was not met, refunding at least a portion of the fee to the user from the guarantor of the service.

20 Claims, 7 Drawing Sheets

(51) Int. Cl.
*G06F 21/62* (2013.01)
*G06Q 30/02* (2012.01)
*G06F 21/10* (2013.01)
*G06Q 20/12* (2012.01)
*G06N 5/00* (2006.01)
*G06Q 20/38* (2012.01)

(52) U.S. Cl.
CPC ........... G06N 5/006 (2013.01); G06Q 20/065 (2013.01); G06Q 20/1235 (2013.01); G06Q 20/383 (2013.01); G06Q 20/38215 (2013.01); G06Q 30/0277 (2013.01)

(58) Field of Classification Search
CPC .. G06Q 20/383; G06Q 30/02; G06Q 30/0201; G06Q 30/0601; G06Q 30/0631; G06Q 30/0641; G06Q 30/0609; G06F 21/10; G06F 21/6245
See application file for complete search history.

(56) References Cited

U.S. PATENT DOCUMENTS

| | | | | |
|---|---|---|---|---|
| 2002/0156719 A1* | 10/2002 | Finebaum | .............. | G06Q 40/04 705/37 |
| 2003/0105718 A1* | 6/2003 | Hurtado | ............. | G06Q 20/3821 705/51 |
| 2006/0272028 A1* | 11/2006 | Maes | ................... | H04L 65/4007 726/27 |
| 2008/0243886 A1* | 10/2008 | Oosawa | .................. | G16H 30/40 |
| 2008/0285475 A1* | 11/2008 | Menditto | .............. | H04M 15/80 370/252 |
| 2010/0038416 A1* | 2/2010 | Canora | .................. | G06Q 30/02 235/375 |
| 2010/0286998 A1* | 11/2010 | Picken | ................... | G16H 10/20 705/2 |
| 2012/0167189 A1* | 6/2012 | Aichroth | ................ | H04L 9/006 726/7 |
| 2012/0227099 A1* | 9/2012 | Fawer | .................... | G06Q 40/02 726/9 |
| 2016/0253710 A1* | 9/2016 | Publicover | ......... | H04N 21/4532 705/14.66 |
| 2017/0149796 A1* | 5/2017 | Gvili | ....................... | H04L 9/085 |
| 2017/0249623 A1* | 8/2017 | Cole | ...................... | G06Q 20/29 |
| 2017/0308943 A1* | 10/2017 | Scarasso | ............ | G06Q 30/0617 |

OTHER PUBLICATIONS

U.S. Appl. No. 14/858,389, filed Sep. 18, 2015.
U.S. Appl. No. 15/290,142, filed Oct. 11, 2015.
U.S. Appl. No. 14/970,966, filed Dec. 16, 2015.
U.S. Appl. No. 15/082,509, filed Mar. 28, 2016.
U.S. Appl. No. 15/209,834, filed Jul. 14, 2016.
U.S. Appl. No. 15/258,297, filed Sep. 7, 2016.

* cited by examiner

ZERO KNOWLEDGE THIRD PARTY GUARANTEE OF SERVICE ON DECENTRALIZED COMPUTING PLATFORM

BACKGROUND

The present invention generally relates to services, and more particularly to providing services that maintain the privacy of users.

Some early attempts have been made to enable procurement of goods and services through a blockchain-based smart contract, guaranteed by a trusted or neutral third party, but these are limited to individuals or corporate bodies that may collude with one of the parties in the transaction, or programs that are equally subject to subversion or operate on insufficient information to make trusted judgements.

Existing reputation systems cannot track individuals across multiple providers of goods and services, thus making it possible for individuals to provide false positive or negative feedback affecting the reputation of providers with no concern for their own reputation.

SUMMARY

One embodiment of a service is a computer-implemented method. The method includes running on a server, for example as a cloud server. The method provides services with a guarantee from a guarantor. The service includes receiving, from a user using a zero-knowledge protocol to ensure privacy of the user, a request for a service with an associated quality level for a fee. Next, the request for service received requires a guarantee of the service requiring additional assurances based on a rating quantity available by a guarantor of the service is identified. At least a portion of the rating quantity available by the guarantor of the service is received. A notification from the user that the service is unacceptable is received. In response to the notification and a verification that the associated quality level was not met, refunding at least a portion of the fee to the user from the guarantor of the service. The fee can be a cryptocurrency. The service may be provided with zero-knowledge verifiable computing.

In one embodiment, the method includes executing at least a portion of a content media player application on a user device using a zero-knowledge protocol to ensure privacy of the user, and the content media player application including digital right management technology using zero-knowledge verifiable computing to enforce usage conditions on multimedia content. The verification is a response from the user device that at least the portion of the content media player application has not executed on the user device.

In another embodiment, the method includes selecting the guarantor of the service from two or more guarantors of the service, based on the request for service received with the associated quality level.

In still another embodiment, the method includes receiving a unique token associated with the user that is indicative of a reputation score of the user and adjusting the fee paid by the user based on the reputation score.

In yet another embodiment, a determination of an attribute of the service requested by the user is made. The fee paid by the user is adjusted based on the attribute of the service. For example, the service may send an advertisement to a user device and the fee paid by the user based on whether the advertisement is displayed. For example the attribute could represent a complexity of the service or a risk associated with the particular combination of the user and the service provider based on their reputations. In this example a provider might have a bad reputation for frequent crashes, and the user might complain and try to claim refunds much more often than average.

Another embodiment may include sending a request to the user for personally identifiable information and adjusting the fee paid by the user.

The zero-knowledge verifiable computing includes but is not limited to any of succinct computational integrity and privacy (SCIP) technique, zero-knowledge succinct non-interactive argument of knowledge (zk-snark) technique, or a probabilistically checkable proof (PCP) technique. The proof can be whether the program is using at least one of trusted computing, secure boot attestation, or a combination or derivative technique thereof.

Other embodiments of the invention include a system and a computer program product.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
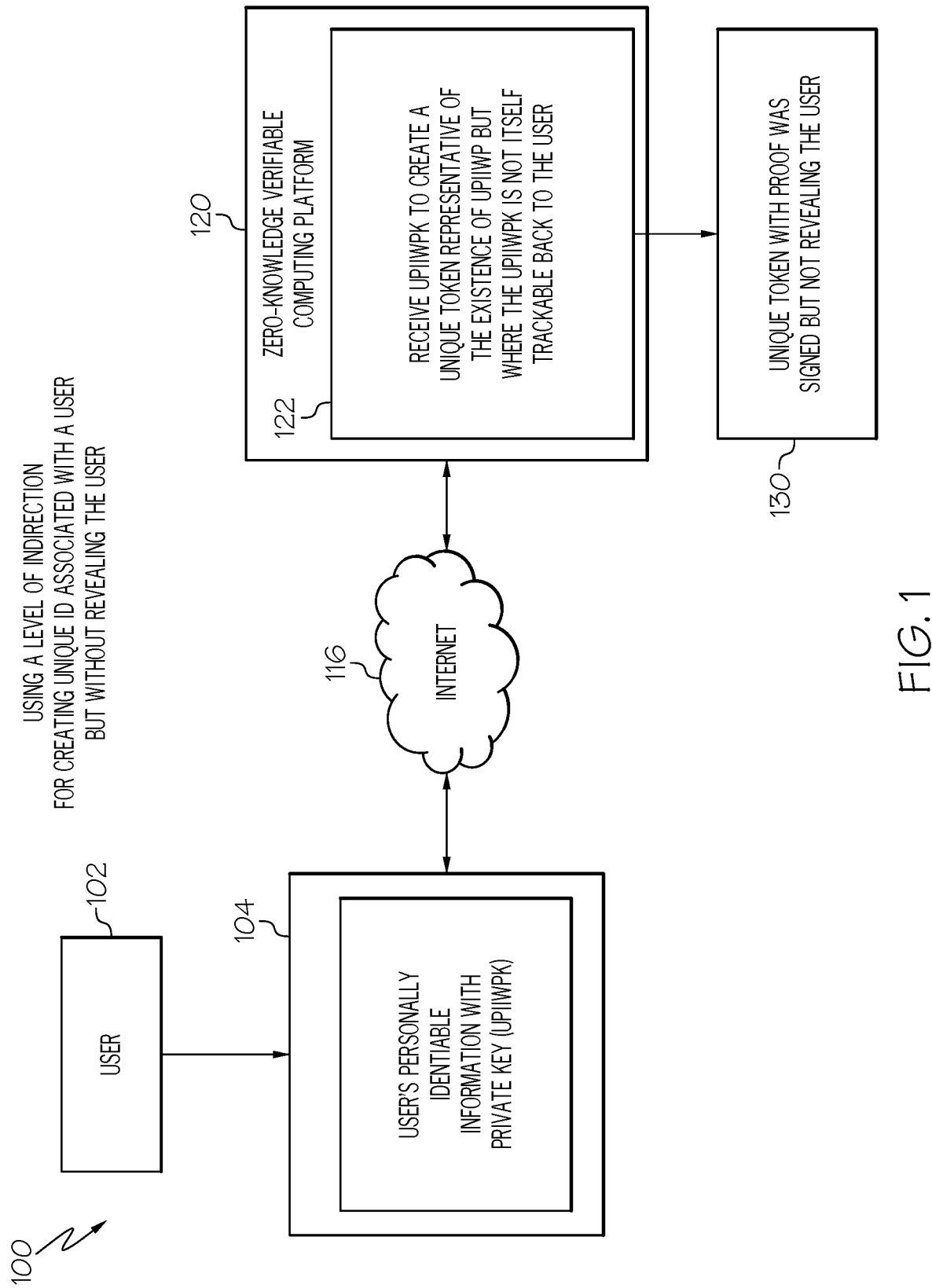
FIG. 1 is a functional diagram illustrating one example of using indirection to create a unique token for a specific user without revealing which user is associated with the token, in accordance with an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s)

disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Aspects of the present invention includes using verifiable zero knowledge computing with smart contract capabilities by allowing a third party to provide a guarantee backed by one or more of their reputation, cryptocurrency, and/or actual currency.

The present invention builds on the idea of zero knowledge reputation service and cryptocurrency payment. The services can be advertised on the cloud, preferably the decentralized peer to peer cloud with integrated anonymity features to be guaranteed by a trusted third party in a way that integrates cleanly with the reputon or reputation system.

Guarantors can advertise their guarantor service into the distributed registry, such as block chain, for a set fee or with a fee schedule based on different types of service to be guaranteed. All parties to any transaction may assert their identity, either anonymously or transparently, so that each of the three parties can make informed decisions—even if entirely automated—about the others with whom they are to transact.

These measurements can be locally attested using trusted computing with remote attestation and verified remotely using zero knowledge using cryptographic verified computing techniques.

In a preferred embodiment of these services as zero-knowledge verifiable attestable operating system containers using secure processors, the services would be advertised through the decentralized registry.

Many-party transactions are contemplated and can be assembled in many ways, serially, in parallel, atomically, or in various combinations. The guarantor relieves the burden of cryptographic verification from the others while at the same time minimizing their risk in participating in the decentralized anonymous cloud economy.

An embodiment of the present invention is provided as part of a cloud service, which ties the reputation of services on the internet to the reputations of individuals providing feedback on those services. The present invention functions across many services and providers. In some embodiments, the service operates in zero-knowledge verifiable computing in order to improve confidence of anonymity among all participating parties. It can provide a reasonable basis for trusted transactions between unknown parties, but not disclosed in current literature.

This individual service is just a one example. In other examples, this reputation service is tied to other services such as background check services. Also this reputation services can tie individuals to other individuals and any participant-to-any other participant.

The present invention provides an anonymous service which can reliably collect and maintain reputation information on both cloud services and individuals that use and provide feedback on them. Existing reputation systems rely on service providers, which collect sensitive personal information on individuals and on providers of goods and services.

An embodiment of the inventive system defines and ties a unique set of quantified, normalized reputation characteristics to individuals participating in the system.

By tying reputations to an individual's e-passport identifier, a corporation's business tax ID or the private key of a DNS Domain registered with a Certificate Authority, or any similarly unique token to the participant's behavior as recorded through anonymous feedback from other system participants, the system motivates individual participants to "behave well" as judged by the overall community of participants, without compromising the individual's privacy or revealing information that could be used to identify any individual participant.

The overall reputation algorithm for the reputation system may be as simple as a tally of unitary "up votes" and "down votes" by the overall community or more complex algorithms making use of weighting factors such as seniority and reputation within a closed sub-community, the number of users of a service provided by a corporate body such as a commercial enterprise, or any number of other factors. Some embodiments depend on a zero-knowledge method of gathering and maintaining an individual's or a corporate body's reputation score, not on the specific tally algorithm.

Provability/Verifiability: The disclosed system is a set of services advertised in a distributed peer to peer network of cloud services, each of which would be verifiable as valid and untampered—with using Probabilistically Checkable Proofs (PCPs), Zero-Knowledge Succinct Non-Interactive Arguments of Knowledge (ZK-SNARKs), Succinct Computational Integrity and Privacy (SCIP), or similar methods of verified computational integrity.

Repeat Feedback: The problem of a single participant providing repeated feedback regarding another participant can be solved using an algorithm which discounts the value of repeat feedback. For example, the first up vote or down vote by one participant on another may count as one reputation-unit, with each subsequent vote counting as half the value of the preceding vote, asymptotically approaching two reputation-units.

Sybil Attacks: The well-known problem of Sybil Attacks is based on the ability of an individual or group to set up many apparent participants which vote as a bloc. This attack on the system is foiled by the use of unique or nearly-unique participation tokens such as e-passport identifiers or tax IDs which are relatively difficult to amass in large enough numbers to have enough effect to warrant the trouble of accumulating them.

Ideological or Political Communities: One of the more problematic issues for the reputation system is the ability of an ideologically similar group to up-vote or down-vote en masse, potentially destroying or unduly elevating the reputation of an individual or corporate participant. The simplest, though imperfect, method of managing such effects is through simple numbers with each vote equating to one reputation i.e., discounting repeat votes as described above. In this case, participants rely on the relatively large number of positive votes from their own community to balance out those of the opposing community. More sophisticated algorithms may be employed to provide greater protection, by identifying ideological blocs as statistical cohorts and discounting their grouped feedback, similarly to the repeat feedback method described above. Still more sophisticated methods may track a range of reputation information rather than a single quantity, as in the case of the composite reputation described below.

Composite Reputations: An optional extension of the basic reputation system would track a participant's reputation as a composite set of quantities representing reputation within a particular context. For example, reputation could be tracked based on membership in and prominence and size of particular cohorts or groups or association such as:

Buyers.

Sellers.

Service Providers or Service Consumers.

Buyers, Sellers, Providers and Consumers in the context of a particular service or class of services.

Ideological or political groups, as identified algorithmically or by the participant's attestation of membership in one or more of these groups.

A composite reputation score, in one example, is determined either in general based on size or prominence of each group or cohort, or specific to the context of the participant querying the system for another participant's reputation score, optionally customizable according to the preference of the user performing the query.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The phrase "identifier of a person" means a pointer or link to a person. The pointer is usually pointing to a person's information stored in a file or database.

The term "guarantor" means a person or organization that guarantees something.

The term "guarantee" means to provide a formal assurance or promise, especially that certain conditions shall be fulfilled relating to a product, service, or transaction.

The term "notification" means a message

The term "rating" or "ranking" means a ranking of a person or business entity, such as a company, LLC, PA, etc., based on a comparative assessment of their quality, standard, or performance.

The term "service" means consulting, legal, real estate, education, communications, storage, processing, and many other services provided by a business entity or individual.

The term "unique token" means digital certificate signed by a trusted certificate authority, such as epassport, tax identifier, or private key of DNS domain registered with a certificate authority, in which the signature can be validated without revealing which user it is associated to the epassport.

The phrase "verifiable computing" in cryptography, is a method by which one party, the prover, or as used in this patent a "user", can prove to another party, the verifier as used in this patent a "content provider" or "service provider" providing content that a program has been or is being executed correctly and without modification or tampering.

A "zero-knowledge protocol", in cryptography, is a method by which one party, the prover, or as used in this patent a "user", can prove to another party, the verifier as used in this patent a "service provider" providing a service that a given statement is true, without conveying any information apart from the fact that the statement is indeed true.

The phrase "zero-knowledge verifiable computing" is a method of verifiable computing which can also function with a zero-knowledge protocol. Examples of zero-knowledge verifiable computing are succinct computational integrity and privacy (SCIP) technique, zero-knowledge succinct non-interactive argument of knowledge (zk-snark) technique, and the zero-knowledge protocol with a probabilistically checkable proof (PCP) technique.

Using Indirection to Create a Unique Identifier

FIG. 1 is a functional diagram 100 illustrating one example of using indirection to create a unique token for a specific user without revealing which user is associated with the token, in accordance with the present invention. As depicted, a user 102, makes available the user's personally identifiable information with a private key ("UPIIWPK") 104. By way of example and without limitation, examples of uniquely identifiable information include: an epassport, a tax id, or a private key of DNS domain registered with a certificate authority. An epassport is also known as a biometric passport. It looks like a traditional passport book, but it contains an electronic chip that is encoded with the same information found of the passport (surname, given name, date of birth and sex). It also includes a digital picture of the bearer's face.

The user can use any computer system, for example, information processing systems such as desktop computers, laptop computers, servers, wireless devices (e.g., mobile phones, tablets, personal digital assistants), and the like, to send the UPIIWPK in order to create a unique token 122 on system 120.

In some embodiments, the public network 116 and computing platform 120 is part of a cloud computing environment (collectively represented in FIG. 1 by the combination of network 116 and platform 120). Cloud computing will be discussed in more detail with reference to FIG. 5. It should be noted however, that various embodiments of the present invention are applicable to non-cloud computing environments as well. With reference to the example depicted in FIG. 1, a user 102 is shown communicatively coupled to computing platform 120 via a public network 116 such as the Internet.

In one example, a cloud user (via a user systems 102) can use a cloud environment 116, 120 to create a unique token 122 using a zero-knowledge verifiable computing platform 120 after receiving the user's personally identifiable information with private key (UPIIWPK). The output is a unique token with proof it was signed but without revealing which user signed it 130.

Reputation Service Operating Environment

Figure 2:
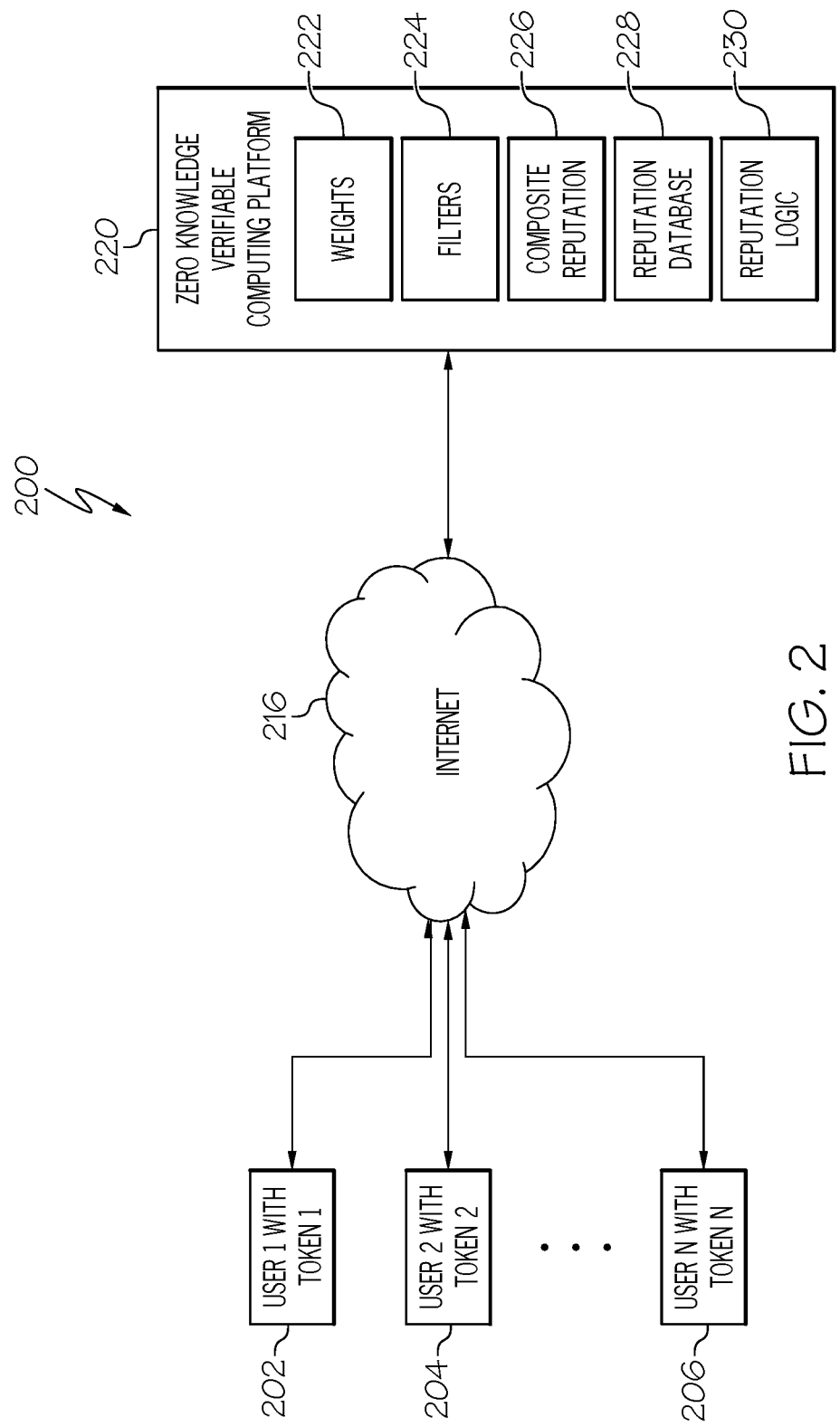
FIG. 2 is a functional diagram illustrating a reputation service using the unique token of FIG. 1, in accordance with an embodiment of the present invention.

FIG. 2 is a functional diagram 200 illustrating a reputation service using the token of FIG. 1. Again, it should be noted that although the following discussion is directed to a cloud computing environment various embodiments are application to non-cloud computing environments as well. With reference to the example depicted in FIG. 2, one or more client/user systems 202, 204, 206 can be communicatively coupled to computing platform 220 via a public network 216 such as the Internet. The user systems 202, 204, 206 can include, for example, information processing systems such as desktop computers, laptop computers, servers, wireless devices (e.g., mobile phones, tablets, personal digital assistants, etc.), and the like.

In a cloud computing embodiment, user systems 202, 204, 206 can access the cloud computing environment 216, 220 via one or more interfaces (not shown) such as a web browser, application, etc. to utilize resources provided by a zero knowledge verifiable computing platform 220. The computing platform 220 includes a reputation database 226 which can be searched to find the ranking of a party, under control of reputation logic 230. The platform 220 can also include a composite reputation 226, filter(s) 224 and weight(s) 222. As previously described above, composite reputation 226 is an optional extension of the basic reputation system. The composite reputation 226 can track a participant's reputation as a composite set of quantities representing reputation within a particular context. For example, reputation could be tracked based on membership in and prominence and size of particular cohorts or groups or association. In some embodiments, filter 224 and weight(s) 222 work cooperatively with the composite reputation 226 to filter out a particular group or association. Weight(s) 222 may also be applied to reflect prominence in the group.

Guarantee of Service

Figure 3:
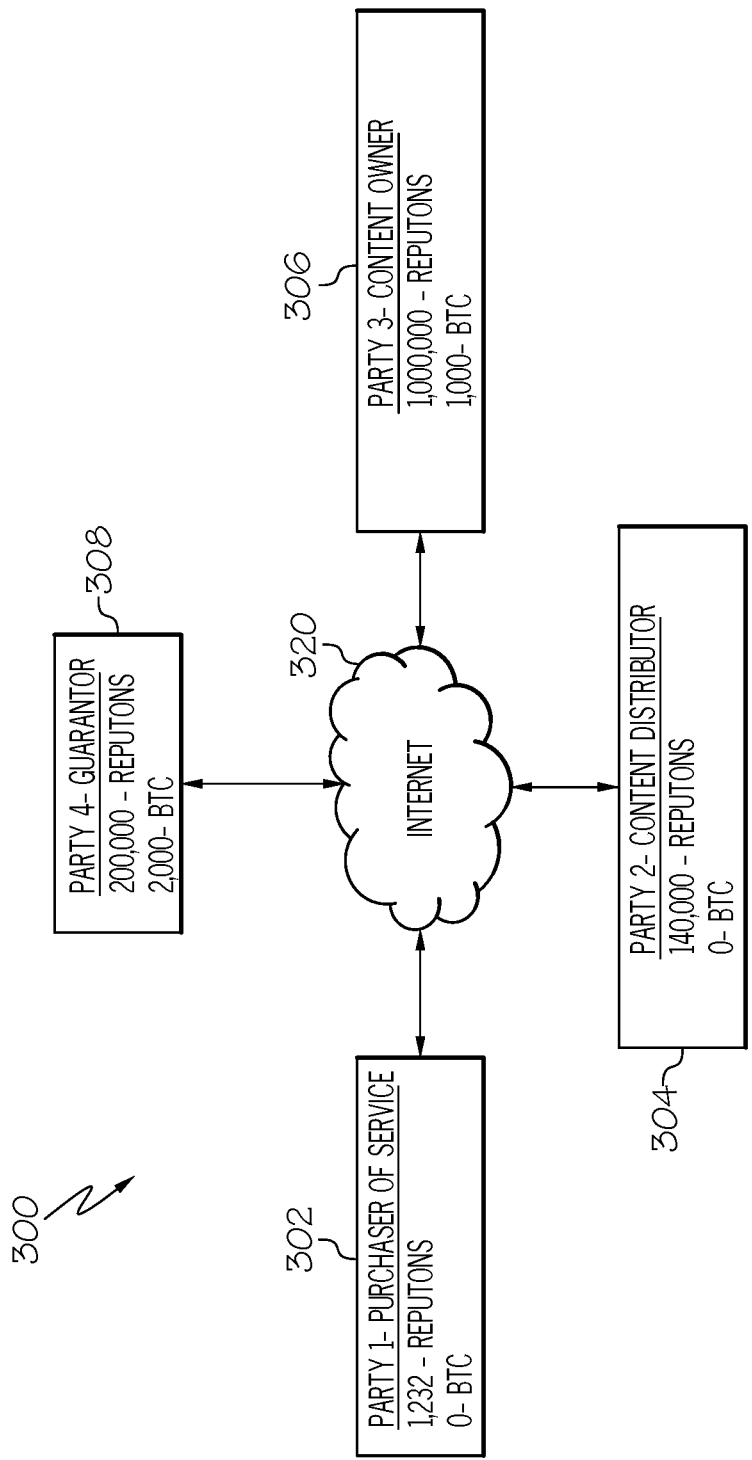
FIG. 3 is a functional diagram illustrating providing a service with a guarantee from a guarantor using the unique token of FIG. 1, in accordance with an embodiment of the present invention.

FIG. 3 is a functional diagram 300 illustrating providing a service with a guarantee from a guarantor using the unique token of FIG. 1, in accordance with an embodiment of the present invention.

Many specialized guarantors may exist for particular transactions, and they may have fee schedules that accommodate different transaction features. These may include:

- Accommodating participants with poor reputation for a higher fee
- Varying fees by type and value of the transaction guaranteed
- Varying fees by computational complexity of the verification required
- Varying fees depending on identification vs. anonymity of the parties involved
- Operating for free or subsidizing certain transactions based on other parties' agreement to other transactions such as watching an ad or sharing some personal information Example 1

Party 1 302 is an anonymous individual, such as a user. This Party 1 302 that has a reputation amount 1232. Party 1 302 wishes to rent movie M for 24 hours to play on a verified multimedia content player, using a copy cached nearby.

Party 2 304 is an anonymous content delivery network (CDN) business. This Party 2 304 has a reputation 140,000. Party 2 304 has a cached copy of movie M at a location close to Party 1 302.

Party 3 306 is a named content owner 306. This Party 3 306 has a reputation of greater than 1 Million. Party 3 306 owns the content and offers it for rental but requires a guarantor of reputation greater than 100,000 backed by escrow of greater than 1000 bitcoins or other crypto currency (BTC).

Party 4 308 is named transaction guarantor. This Party 4 308 has a reputation >200,000. Party 4 308 holds 2000 BTC in escrow as "partial reserve" guarantee against falsified transactions Party 2 302 through Party 4 308 advertise their services along with the terms and conditions in the decentralized registry. Party 1 302 may set up the transaction by requesting the service only from Party 3 306, which then engages Parties 2 304 and 4 308, or may request the services of Party 2 304, Party 3 306, and Party 4 308 as one atomic transaction. Party 4 308 being the Party with the most to lose, it falls to them to perform the cryptographic verification on the others' programs before final commit Assuming each Party 302, 304, 306, 308 agrees to the terms of the others successfully during the first phase of the commit process, they all signal that the transaction can be committed atomically, and it executes.

Now if the movie fails to be delivered perhaps due to a cache node failure in Party 2 304, Party 1 302 notifies the other parties of the failure state of his verified player program, requesting a refund. Party 2 304 and Party 4 308 must now refund the original price or face reputon penalties. If they fail to do so, the guarantor will refund the fees to the Party 1 302 after the verified multimedia content player's exist state, down vote the party at fault, and probably will not do business with that party again. All steps can take place free of human intervention in this example case.

Example 2

A specialized guarantor agrees to act as a bonding agency for the successful completion of a crowdfunded effort to produce a movie. The crowd funding would be accumulated to a many-party smart. Contract formulated as a verifiable open-source zero-knowledge program or a traditional cryptocurrency-based smart contract. It would disburse money as goals are met based on knowledge in the reputon knowledge space and potentially based on the reputon-related prediction market.

Guarantee Service Flow

Figure 4:
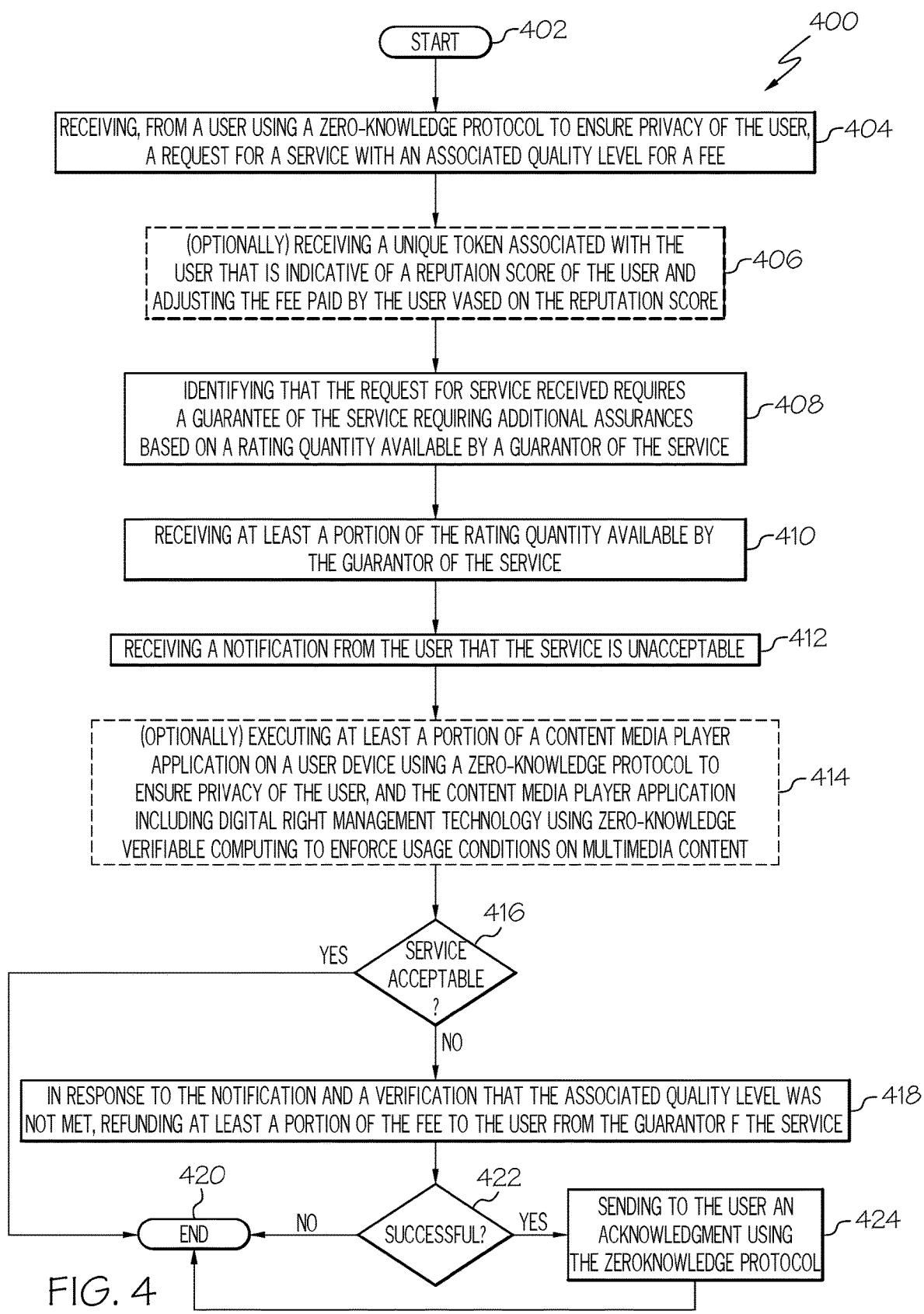
FIG. 4 is a flow diagram illustrating ranking a party as part of the reputation service, in accordance with an embodiment of the present invention.

FIG. 4 is a flow diagram 400 illustrating providing one or more services with a guarantee from a guarantor.

The method comprising begins in step 402 and immediately proceeds to step 404. Party 1 302 in FIG. 3, for example, initiates a reputation process. One embodiment of a service is a computer-implemented method. The method includes running on a server, for example as a cloud server, services with a guarantee from a guarantor.

In step 404 the method includes receiving, from a user using a zero-knowledge protocol to ensure privacy of the user, a request for a service with an associated quality level for a fee. The process continues to step 406.

Optionally in step 406 the method includes receiving a unique token associated with the user that is indicative of a reputation score of the user and adjusting the fee paid by the user based on the reputation score. In another embodiment, the fee is adjusted based on one or more of the reputation score of the user, the escrow money of the user, and the escrow money of the content provider. The process continues to step 408.

In step 408 the request for service received requires a guarantee of the service requiring additional assurances based on a rating quantity available by a guarantor of the service is identified. The process continues to step 410.

In step 410 at least a portion of the rating quantity available by the guarantor of the service is received. The process continues to step 412.

In step 412, a notification from the user that the service is unacceptable is received. The process continues to step 414.

Optionally in step 414 the method includes executing at least a portion of a content media player application on a user device using a zero-knowledge protocol to ensure privacy of the user, and the content media player application including digital right management technology using zero-knowledge verifiable computing to enforce usage conditions on multimedia content. The verification is a response from the user device that at least the portion of the content media player application has not executed on the user device.

In step 416 a test is made to the notification and a verification that the associated quality level was not met. If the quality level was met, the process ends in step 420.

Otherwise if the quality level was not met, the process continues to step 418.

In step 418 a refund at least a portion of the fee to the user from the guarantor of the service. The fee can be a cryptocurrency. The service may be provided with zero-knowledge verifiable computing. The process continues to step 424.

In step 424 an acknowledgment is sent to the using a zero-knowledge protocol to maintain privacy of the user. The process then proceeds to step 420 to end.

In another embodiment, the method includes selecting the guarantor of the service from two or more guarantors of the service, based on the request for service received with the associated quality level.

In yet another embodiment, a determination of an attribute of the service requested by the user is made. The fee paid by the user is adjusted based on the attribute of the service. For example, the service may send an advertisement to a user device and the fee paid by the user based on whether the advertisement is displayed. For example the attribute could represent a complexity of the service or a risk associated with the particular combination of the user and the service provider based on their reputations. In this example a provider might have a bad reputation for frequent crashes, and the user might complain and try to claim refunds much more often than average.

Another embodiment may include sending a request to the user for personally identifiable information and adjusting the fee paid by the user.

The zero-knowledge verifiable computing includes but is not limited to any of succinct computational integrity and privacy (SCIP) technique, zero-knowledge succinct non-interactive argument of knowledge (zk-snark) technique, or a probabilistically checkable proof (PCP) technique. The proof can be whether the program is using at least one of trusted computing, secure boot attestation, or a combination or derivative technique thereof.

Generalized Computing Environment

Figure 5:
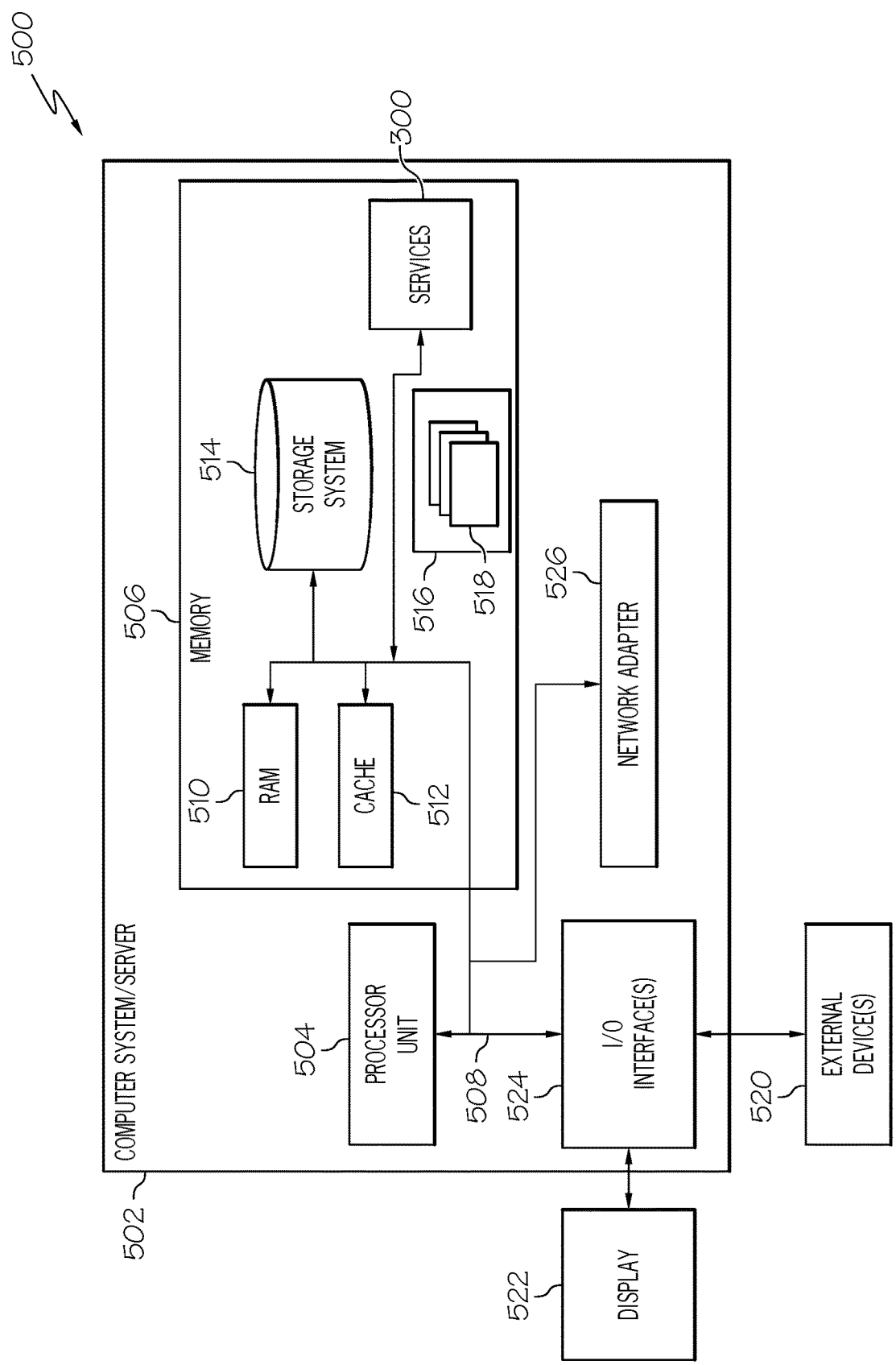
FIG. 5 illustrates one example of a cloud computing node, in accordance with an embodiment of the present invention.

FIG. 5 illustrates one example of a processing node 500 for operating the zero-knowledge verifiable computing platform 120, in accordance with an embodiment the present invention. This example is not intended to suggest any limitation as to the scope of use or functionality of embodiments of the invention described herein and the processing node 500 is capable of being implemented and/or performing any one or more of the functionalities set forth herein.

As depicted, processing node 500 can be a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules as further described below, being executed by a computer system. Generally, program modules may include routines, programs, objects, components, logic, data structures, and so on that perform particular tasks or implement particular abstract data types. Computer system/server 502 may be practiced as one node of a distributed cloud computing environment, an example of which will be described with reference to FIG. 5. In such cloud computing environments, tasks are performed by remote processing devices that are linked through a communications network. In a distributed cloud computing environment, program modules 518 may be stored in one or more local and remote computer system storage media, including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506, in one embodiment, implements the functions of FIG. 2 and the processes described with reference to FIG. 3. The system memory 506 can include computer readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one computer program product having a set (e.g., at least one) of program modules 518 stored that are configured to carry out functions of various embodiments of the invention.

Program/utility 516, having a set (at least one) of program modules 518, may be stored in memory 506 by way of example, and not limitation, as well as an operating system, one or more application programs, other program modules, and program data, such as services 300 with guarantee from a guarantor in FIG. 3. Each of the operating system, one or more application programs, other program modules, and program data or some combination thereof, may be adapted to a networking environment. In some embodiments, program modules 518 carry out the functions and/or methodologies of various embodiments of the invention described herein. For example With reference again to FIG. 5, computer system/server 502 may also communicate with one or more external devices 520 such as a keyboard, a pointing device, a display 522, etc. Such external devices 520 include one or more devices that enable a user to interact with computer system/server 502; and/or any devices (e.g., network card, modem, etc.) that enable computer system/server 502 to communicate with one or more other computing devices. Such communication/interaction can occur via I/O interfaces 524. In some embodiments, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 6:
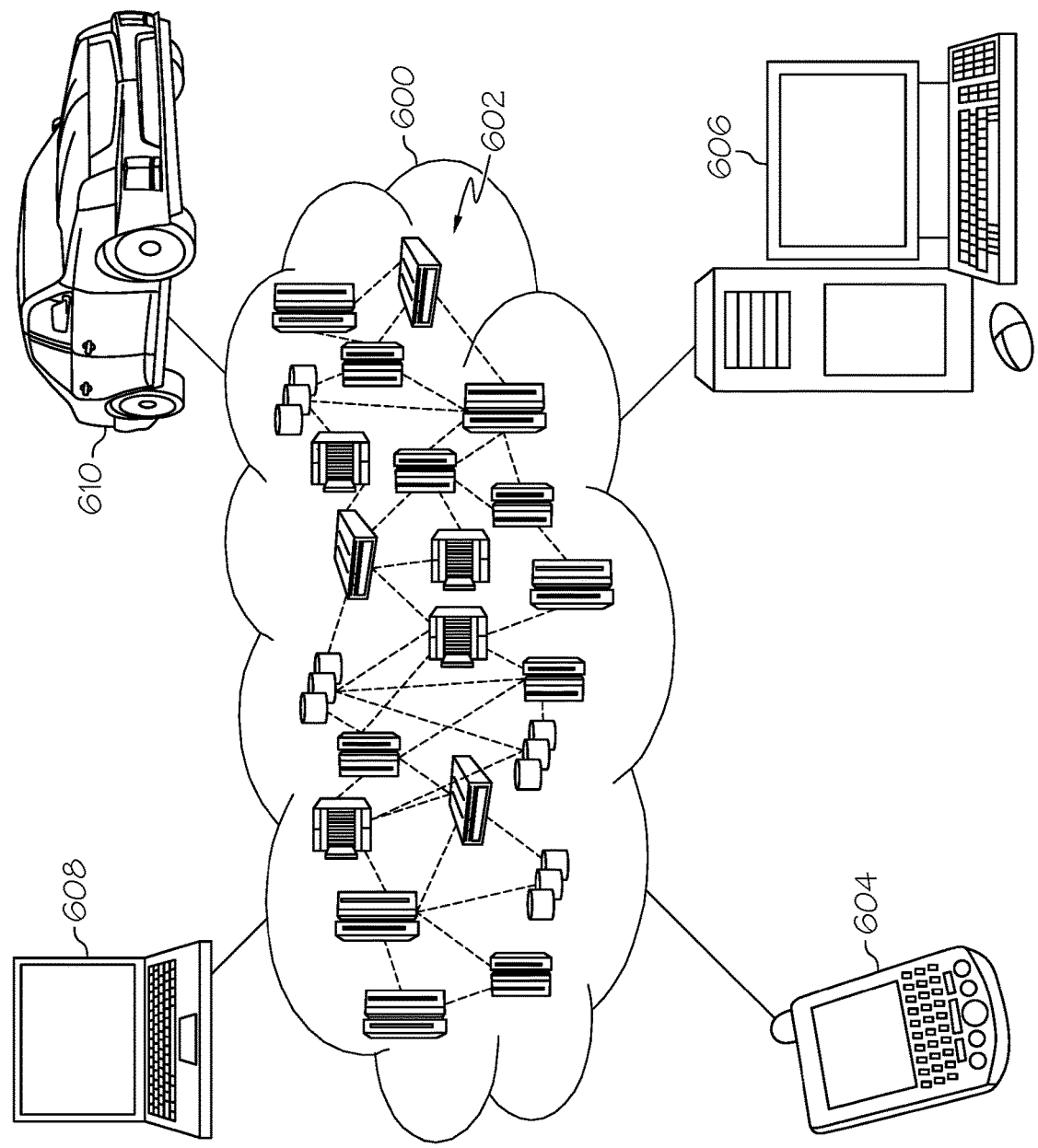
FIG. 6 illustrates one example of a cloud computing environment, in accordance with an embodiment of the present invention.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604, desktop computer 606, laptop computer 608, and/or automobile computer system 610 may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604, 606, 608, 610 shown in FIG. 6 are intended to be illustrative only and that computing nodes 602 and cloud computing environment 600 can communicate with any type of computerized device over any type of network and/or network addressable connection (e.g., using a web browser).

Figure 7:
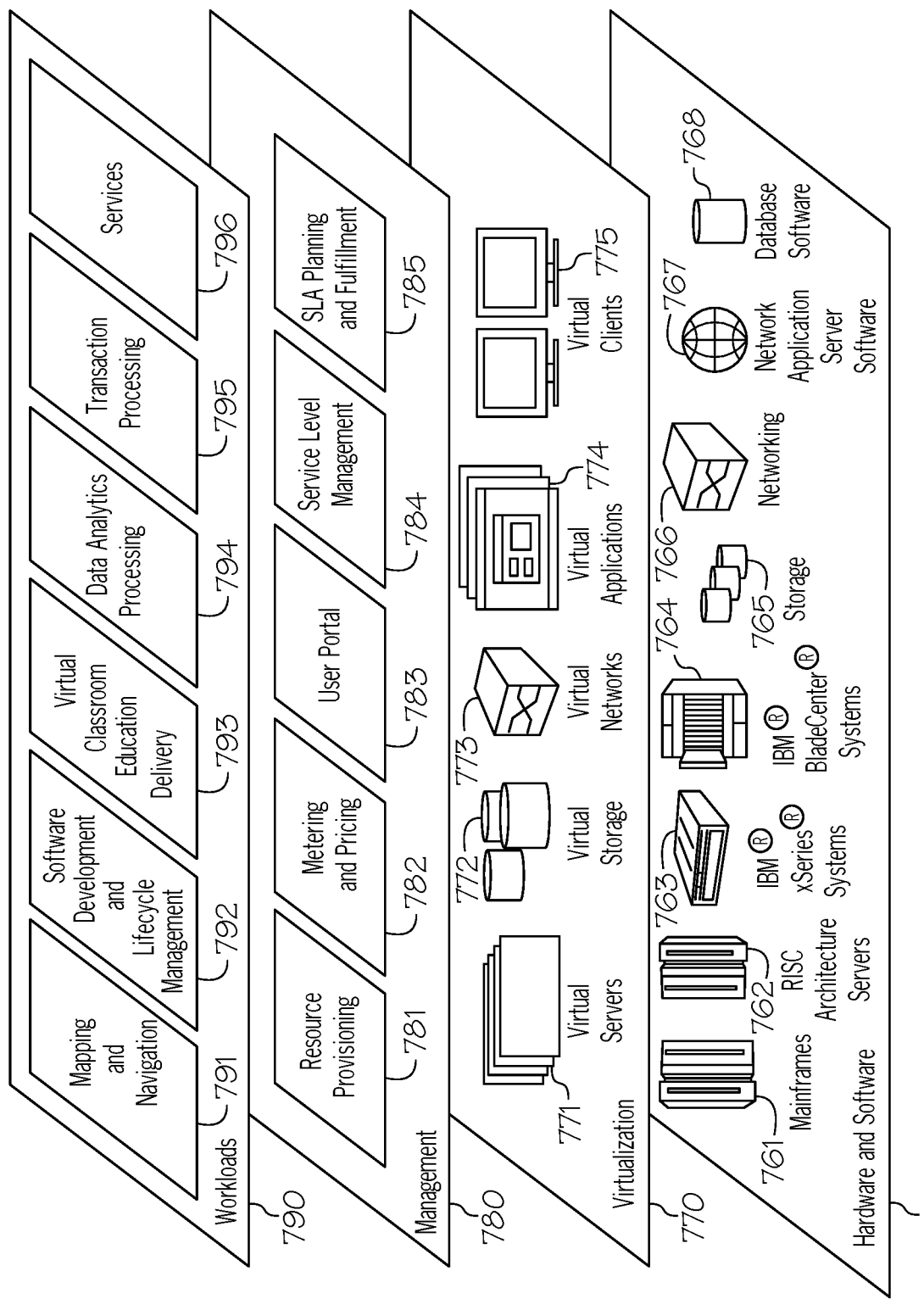
FIG. 7 illustrates abstraction model layers, in accordance with an embodiment of the present invention.

Referring now to FIG. 7, an exemplary set of functional abstraction layers provided by cloud computing environment 600 is shown. It is understood in that the components, layers, and functions shown in FIG. 7 are illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and 796 for delivering services with a guarantee from a guarantor in accordance with embodiments of the present invention.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for providing at least one service with a guarantee from a guarantor using a combination of indirection, cryptographic communications and verifiable computing to ensure privacy of a user, the method comprising:

receiving, at a zero-knowledge verifiable computing platform, personal identifiable information with a private key from a user;

generating, using the zero-knowledge verifiable computing platform, a unique token associated with the user and generating a first proof in which a signature is validated without revealing which user it is associated, the first proof is based on trusted computing or secure boot attestation;

sending from the zero-knowledge verifiable computing platform the unique token that has been generated with the first proof to the user;

receiving, at the zero-knowledge verifiable computing platform, from the user the unique token indicative of a user reputation score, using a zero-knowledge protocol to ensure privacy of the user, a request for a service from a user with an associated quality level for a fee, wherein the associated quality level is comparative assessment of a performance of the service relative to other providers of the service;

confirming, at the zero-knowledge verifiable computing platform, that a signature of the unique token is valid;

identifying, at the zero-knowledge verifiable computing platform, a minimum reputation score required by a content owner for content to be delivered as part of the service and that the request for service provided by a service provider requires additional reputation score available to a guarantor of the service;

receiving, at the zero-knowledge verifiable computing platform, from the guarantor of the service at least a portion of the guarantor of service reputation score available to the guarantor of the service, wherein the user, the service provider and the guarantor of the service are separate parties;

generating a second proof based on the zero-knowledge protocol;

sending, using the zero-knowledge protocol to ensure privacy of the user, content from the service provider to a content media player application on a user device along with the second proof;

receiving, at the zero-knowledge verifiable computing platform, a notification from the user device that the service is unacceptable, the notification is a response to at least a portion of the content media player application not executing on the user device;

in response to the notification and a verification that the associated quality level was not met, refunding, by the zero-knowledge verifiable computing platform, at least a portion of the fee to the user from the guarantor of the service; and in response to the guarantor of the service not refunding at least a portion of the fee to the user based on the associated quality level was not met, reducing, at the zero-knowledge verifiable computing platform, a service provider reputation score available to the service provider of the service.

2. The computer-based method of claim 1, wherein the notification is a response to at least a portion of a content media player application not executing on the user device, the content media player application using a zero-knowledge protocol to ensure privacy of the user, and the content media player application including digital right management technology using zero-knowledge verifiable computing to enforce usage conditions on multimedia content.

3. The computer-based method of claim 1, further comprising:

selecting the guarantor of the service from two or more guarantors of the service, based on the request for the service received with the associated quality level.

4. The computer-based method of claim 1, wherein the receiving, at the zero-knowledge verifiable computing platform, the unique token associated with the user and a reputation score of the user and adjusting the fee paid by the user based on the user reputation score and escrow money of the user, wherein the unique token is a digital certificate signed by a trusted certificate authority or private key of DNS domain registered with a certificate authority, in which the signature can be validated without revealing which user it is associated.

5. The computer-based method of claim 1, further comprising:
determining a complexity of the service requested by the user and adjusting the fee paid by the user based on the complexity of the service.

6. The computer-based method of claim 1, further comprising:
sending an advertisement to a user device and adjusting the fee paid by the user based on whether the advertisement is displayed.

7. The computer-based method of claim 1, further comprising:
adjusting the fee paid by the user based on whether an advertisement is displayed.

8. The computer-based method of claim 1, wherein the fee is a cryptocurrency as payment.

9. The computer-based method of claim 1, wherein the providing at least the portion of the service to the user including providing the service with zero-knowledge verifiable computing.

10. The computer-based method of claim 9, wherein the zero-knowledge verifiable computing is one of
succinct computational integrity and privacy (SCIP) technique,
zero-knowledge Succinct non-interactive argument of knowledge (zk-snark) technique, and
zero-knowledge verifiable computing is probabilistically checkable proof (PCP) technique.

11. A system for providing at least one service with a guarantee from a guarantor using a combination of indirection, cryptographic communications and verifiable computing to ensure privacy of a user, comprising:
a memory;
a processor communicatively coupled to the memory, where the processor is configured to perform:
receiving, at a zero-knowledge verifiable computing platform, personal identifiable information with a private key from a user;
generating, using the zero-knowledge verifiable computing platform, a unique token associated with the user and generating a first proof in which a signature is validated without revealing which user it is associated, the first proof is based on trusted computing or secure boot attestation;
sending from the zero-knowledge verifiable computing platform the unique token that has been generated with the first proof to the user;
receiving, at the zero-knowledge verifiable computing platform, from the user the unique token indicative of a user reputation score, using a zero-knowledge protocol to ensure privacy of the user, a request for a service from a user with an associated quality level for a fee, wherein the associated quality level is comparative assessment of a performance of the service relative to other providers of the service;
confirming, at the zero-knowledge verifiable computing platform, that a signature of the unique token is valid;
identifying, at the zero-knowledge verifiable computing platform, a minimum reputation score required by a content owner for content to be delivered as part of the service and that the request for service provided by a service provider requires additional reputation score available to a guarantor of the service;
receiving, at the zero-knowledge verifiable computing platform, from the guarantor of the service at least a portion of the guarantor of service reputation score available to the guarantor of the service, wherein the user, the service provider and the guarantor of the service are separate parties;
generating a second proof based on the zero-knowledge protocol;
sending, using the zero-knowledge protocol to ensure privacy of the user, content from the service provider to a content media player application on a user device along with the second proof;
receiving, at the zero-knowledge verifiable computing platform, a notification from the user device that the service is unacceptable, the notification is a response to at least a portion of the content media player application not executing on the user device;
in response to the notification and a verification that the associated quality level was not met, refunding, by the zero-knowledge verifiable computing platform, at least a portion of the fee to the user from the guarantor of the service; and
in response to the guarantor of the service not refunding at least a portion of the fee to the user based on the associated quality level was not met, reducing, at the zero-knowledge verifiable computing platform, a service provider reputation score available to the service provider of the service.

12. The system of claim 11, wherein the notification is a response to at least a portion of a content media player application not executing on the user device, the content media player application using a zero-knowledge protocol to ensure privacy of the user, and the content media player application including digital right management technology using zero-knowledge verifiable computing to enforce usage conditions on multimedia content.

13. The system of claim 11, further comprising:
selecting the guarantor of the service from two or more guarantors of the service, based on the request for the service received with the associated quality level.

14. The system of claim 11, wherein the receiving, at the zero-knowledge verifiable computing platform, the unique token associated with the user and a reputation score of the user and adjusting the fee paid by the user based on the user reputation score and escrow money of the user, wherein the unique token is a digital certificate signed by a trusted certificate authority or private key of DNS domain registered with a certificate authority, in which the signature can be validated without revealing which user it is associated.

15. The system of claim 11, further comprising:
determining a complexity of the service requested by the user and adjusting the fee paid by the user based on the complexity of the service.

16. The system of claim 11, further comprising:
sending an advertisement to a user device and adjusting the fee paid by the user based on whether the advertisement is displayed.

17. The system of claim 11, further comprising:
sending a request to the user for personally identifiable information and adjusting the fee paid by the user.

18. A non-transitory computer program product for providing at least one service with a guarantee from a guarantor using a combination of indirection, cryptographic communications and verifiable computing to ensure privacy of a user, comprising a computer readable storage medium having computer readable program instructions embodied therewith, the computer readable program instructions configured to cause a computer to:
receiving, at a zero-knowledge verifiable computing platform, personal identifiable information with a private key from a user;
generating, using the zero-knowledge verifiable computing platform, a unique token associated with the user and generating a first proof in which a signature is validated without revealing which user it is associated, the first proof is based on trusted computing or secure boot attestation;
sending from the zero-knowledge verifiable computing platform the unique token that has been generated with the first proof to the user;
receiving, at the zero-knowledge verifiable computing platform, from the user the unique token indicative of a user reputation score, using a zero-knowledge protocol to ensure privacy of the user, a request for a service from a user with an associated quality level for a fee, wherein the associated quality level is comparative assessment of a performance of the service relative to other providers of the service;
confirming, at the zero-knowledge verifiable computing platform, that a signature of the unique token is valid;
identifying, at the zero-knowledge verifiable computing platform, a minimum reputation score required by a content owner for content to be delivered as part of the service and that the request for service provided by a service provider reputation score available to a guarantor of the service;
receiving, at the zero-knowledge verifiable computing platform, from the guarantor of the service at least a portion of the guarantor of service reputation score available to the guarantor of the service, wherein the user, the service provider and the guarantor of the service are separate parties;
generating a second proof based on the zero-knowledge protocol;
sending, using the zero-knowledge protocol to ensure privacy of the user, content from the service provider to a content media player application on a user device along with the second proof;
receiving, at the zero-knowledge verifiable computing platform, a notification from the user device that the service is unacceptable, the notification is a response to at least a portion of the content media player application not executing on the user device;
in response to the notification and a verification that the associated quality level was not met, refunding, by the zero-knowledge verifiable computing platform, at least a portion of the fee to the user from the guarantor of the service; and
in response to the guarantor of the service not refunding at least a portion of the fee to the user based on the associated quality level was not met, reducing, at the zero-knowledge verifiable computing platform, a service provider reputation score available to the service provider of the service.

19. The computer program product of claim 18, wherein the notification is a response to at least a portion of a content media player application not executing on the user device, the content media player application using a zero-knowledge protocol to ensure privacy of the user, and the content media player application including digital right management technology using zero-knowledge verifiable computing to enforce usage conditions on multimedia content.

20. The computer-based method of claim 1, wherein the service provider reputation score is reduced by a single unit of measure and further comprising:
receiving one or more subsequent notifications from the user device that the service is unacceptable; and
for each notification of the one or more subsequent notifications, reducing the service provider reputation score by half an amount of the notification, thereby asymptotically, approaching two reputation-units.

* * * * *